United States Patent

Conrad

[15] 3,707,228
[45] Dec. 26, 1972

[54] METHOD AND APPARATUS FOR CLASSIFYING ARTICLES

[72] Inventor: Lucas J. Conrad, Winston-Salem, N.C.

[73] Assignee: R. J. Reynolds Tobacco Company, Winston-Salem, N.C.

[22] Filed: April 1, 1970

[21] Appl. No.: 24,710

[52] U.S. Cl. .................................................. 209/124
[51] Int. Cl. ................................................. B07c 7/04
[58] Field of Search ........ 209/12, 2, 45, 46, 123, 124; 17/1, 46; 99/107; 198/30, 209

[56] References Cited

UNITED STATES PATENTS

| | | | |
|---|---|---|---|
| 3,347,369 | 10/1967 | Conlon | 209/124 |
| 1,877,479 | 9/1932 | Lindley, Jr. | 209/124 |
| 1,851,958 | 3/1932 | Hill | 209/124 |

FOREIGN PATENTS OR APPLICATIONS

| | | | |
|---|---|---|---|
| 551,601 | 4/1923 | France | 209/124 |
| 592,230 | 9/1947 | Great Britain | 209/124 |

*Primary Examiner*—Frank W. Lutter
*Assistant Examiner*—Ralph J. Hill
*Attorney*—Lester W. Clark, Robert S. Dunham, P. E. Henninger, Thomas F. Moran, Gerald W. Griffin, R. Bradlee Boal, Christopher C. Dunham and Robert Scobey

[57] ABSTRACT

Apparatus for separating meat and bones including: (1) a disuniter unit which separates the meat from the bones to which it is clinging and discharges a mixture of meat pieces and bones; (2) a separator which receives the mixture of meat pieces and bones and discharges through different outlets a stream of meat pieces and a stream of bones; (3) and an inspection table onto which the discharged streams of meat pieces and bones flow, and where any erroneously sorted meat pieces and bones are manually reclassified.

The inspection and classifying table comprises an annular deck rotatably mounted on a circular supporting frame located entirely under the deck. A motor on the frame continuously rotates the deck. A divider wall is supported above the deck at the middle of its annulus and rests on the deck surface. The wall is stationary and extends 270° around the deck. The wall separates an inner classification area from an outer classification area. The stream of bones is deposited on the outer classification area and the stream of meat pieces on the inner classification area. Operators both inside and outside the annular deck transfer misclassified bones to the outer area and misclassified meat pieces to the inner area. At the downstream end of the divider, a scraper diverts all bones remaining in the outer classification area into a bone receiving bin. In the open deck area between the ends of the wall, the meat pieces are spread across the entire deck area and are removed manually by operators stationed at the outside of the table and deposited in suitable receptacles. As the table approaches the upstream end of the divider wall it encounters another scraper which restores all pieces remaining on the deck to the inner classification area. Thus, all meat pieces passing from the inspection table to the meat receptacles are individually inspected and transferred by hand, minimizing the possibility of the inclusion of a bone piece in the separated meat pieces.

10 Claims, 13 Drawing Figures

METHOD AND APPARATUS FOR CLASSIFYING ARTICLES

CROSS-REFERENCES

The disuniter shown in this application is an improvement on the disuniters shown in Conrad application Ser. No. 603,484, filed Dec. 21, 1966, now U.S. Pat. No. 3,472,300, issued Oct. 14, 1969. Certain other features of the disuniter are shown and claimed in the applications of Conrad and Alldred, Ser. No. 679,326, filed Oct. 21, 1967, now Pat. No. 3,514,808, issued June 2, 1970 and Ser. No. 759,709, filed Sept. 13, 1968 now Pat. No. 3,559,706, issued Feb. 2, 1971.

The separator of this application is an improvement on those shown in the application of Alldred and Conrad, Ser. No. 824,381, filed May 8, 1969 now Pat. No. 3,507,387, issued Apr. 21, 1970 and in Conrad and Everhart, Ser. No. 761,179, filed Sept. 20, 1968 now Pat. No. 3,508,646, issued Apr. 28, 1970. Another feature of the separator is shown in Conrad, Ser. No. 754,233, filed Sept. 22, 1969 now Pat. No. 3,508,645, issued Apr. 28, 1970.

The friction conveyor which catches the meat pieces in the separator and discharges them therefrom is shown in Conrad et al, Ser. No. 761,029, filed Sept. 20, 1968 now Pat. No. 3,547,264, issued Dec. 15, 1970.

The truck mounted disuniter unit at the upper end of the separator is shown and claimed in Conrad and Leonard, Ser. No. 20,564, filed Mar. 18, 1970 (Dkt. 8104).

The bone elevator mechanism at the discharge end of the separator drum is shown and claimed in Conrad and Pope, Ser. No. 9,513, filed Feb. 9, 1970 (Dkt. 8106).

BRIEF SUMMARY OF THE INVENTION

The annular deck of the inspection and classification table is continuously rotated and is mounted on a circular frame located under the deck. A stationary vertical divider wall extends along the middle of the annular deck for about 270° of the table periphery. The divider wall rests on the deck and is laterally and longitudinally guided to maintain its vertical position by a plurality of yokes, each extending radially above the annular deck and mounted on the table supporting frame. Each yoke is provided with a pair of spaced pins extending toward the direction from which the deck approaches the yoke. The divider wall is slotted to receive the yoke. The spacing of the pins is substantially equal to the divider thickness, so that the motion of the table holds the divider in place against the arms. The slot is elongated so that the divider is readily removable for cleaning. At the downstream end of the divider, a yoke supports a scraper for diverting all bones moving in the outer classification area to a bin located under the edge of the table.

Another scraper is located at the upstream end of the divider for restoring all pieces resting on the table in the outer classification area to the inner classification area. Alternatively, this scraper may be set to discharge all pieces remaining on the table to a collecting bin.

Guard rails are mounted concentrically inside and outside the rotating deck to prevent contact between the clothing of the operators and the deck. The yokes are supported on the guard rails.

The deck has a downwardly projecting central rib, which rests on three equally angularly spaced rollers, rotating about horizontal axes. One of these rollers is driven by a motor and is constructed to grip the rib frictionally and drive it positively. Three other equally angularly spaced rollers engage the inside of the rib and rotate about vertical axes.

The method of using the inspection table, which is a feature of the invention, includes the steps of discharging onto the inner classification area near its upstream end a first stream consisting mostly of meat pieces. There is discharged onto the outer classification area near its upstream end a stream consisting mostly of bones. Stations for operators are located both inside and outside the table. Pieces of meat appearing in the stream of bones are manually transferred by the operators across the divider wall into the stream of meat pieces. Furthermore, pieces of bone in the stream inside the divider wall are transferred to the outside stream. Thereafter, the outside stream of bones is scraped into a bone receptacle located at the downstream end of the divider. After the table passes the downstream end of the divider, all the meat pieces remaining in the inner classification area are spread across the open undivided area of the deck and are removed manually by inspectors stationed outside of the table and placed in suitable receptacles. All the meat pieces are selected and removed from the table by the operators, thus minimizing the possible inclusion of bones in the separated meat pieces.

DETAILED DESCRIPTION

Figure 1:
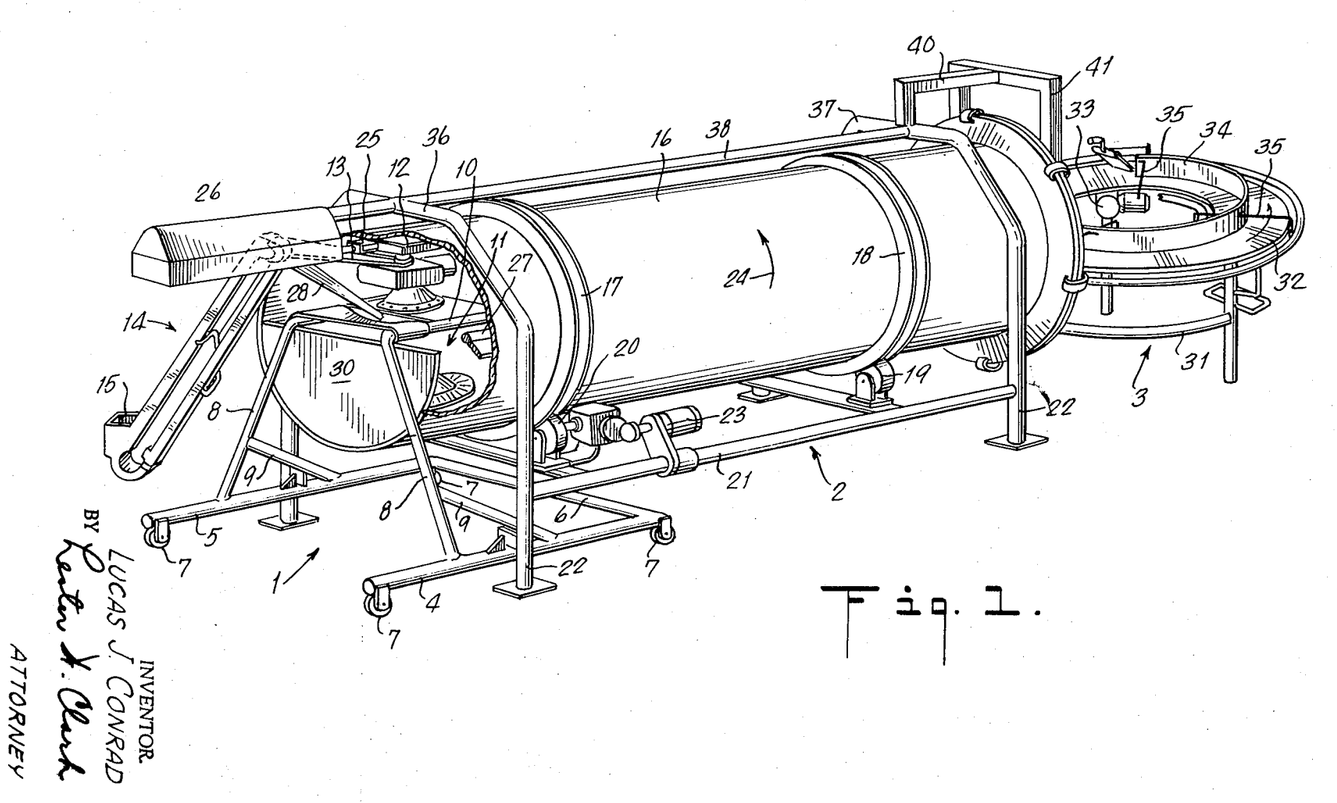
FIG. 1 is an overall perspective view of a complete apparatus for separating meat and bones, including a rotary inspection and classification table constructed in accordance with the invention.

The disuniter apparatus 1 is mounted on a truck including two side frame members 4 and 5 and a cross-frame member 6, all supported on four wheels 7. A pair of diagonal frame members 8 extend upwardly and inwardly from the side frame members 4 and 5. The frame members 8 are braced by struts 9. At their upper ends, the diagonal frame members 8 carry horizontally projecting cantilever beams 10 which together support a disuniter apparatus generally indicated at 11. The disuniter 11 rotates on a vertical shaft 12 connected by a belt 13 to a feed conveyor 14 having at its lower end a hopper 15 into which are fed food pieces to be disunited. Typically, these may be cooked chicken pieces with the meat still clinging to the bones. The apparatus, however, is suitable for use with other types of composite food pieces. These food pieces are discharged from the conveyor 14 through a chute 28 into the top of the disuniter 11. The disuniter separates the meat from the bones and discharges a mixture of bones and meat pieces into the bottom of a drum 16 which is the principal element of the separator apparatus 2.

The drum 16 has on its periphery a pair of grooved collars 17 and 18, which rest on rollers 19 and 20 mounted on a frame having four legs 22 which may be attached to an underlying supporting surface. The roller 20 is driven by a motor 23, effective to rotate the drum 16 in the direction indicated by the arrow 24.

The inside surface of the drum 16 is smooth. The meat pieces tend to cling or stick to this smooth surface, while the bones do not cling. Hence the meat pieces are carried upwardly by the drum as it rotates. As they reach the top of the drum, they fall by gravity or are scraped away from the drum surface so as to fall on a longitudinally extending reciprocating friction conveyor 25 actuated by a reciprocating motor 26 mounted on the frame of the separator 2.

In order to prevent meat pieces from riding up to the top of the drum at the locality of the disuniter 11, there is provided a scraper 27 mounted on the frame of the disuniter truck and extending into the drum 16 a sufficient distance so that none of the meat pieces travel up the drum until they get beyond the disuniter.

The disuniter truck also carries a shield plate 30 which closes substantially the entire lower half of the open upper end of the drum 16, to prevent pieces of meat and bone from falling out that end of the drum.

FIGS. 2–13

The inspection table 3 comprises a frame 31 supporting an annular rotating deck 32 driven by a motor 33. A vertical divider wall 34 extends around the middle of the annular table 32 for most of its periphery, dividing it into inner and outer sections 32a and 32b (see FIG. 2). The wall 32 is held in its vertical position by a plurality of yokes 35.

The frame of the separator apparatus 2 includes an inverted U-shaped frame member 36 at the left-hand end, as it appears in FIG. 1. A similar U-shaped frame member 37 is located at the right-hand end. The central portions of the two U-shaped frame members are connected by a longitudinal beam 38. A cantilever beam 40 extends to the right from the U-shaped frame 37 and supports a hanger frame 41 (FIG. 5) which carries (see FIGS. 2–4) the discharge end of the reciprocating conveyor 25, and has a downward extension 42.

Attached to the end of the drum 39, at its lowest point, is the narrow end of a first tapered ring 43. The attachment of the tapered ring 43 to the drum 16 may be by welding. Another tapered ring 44, opposite in form to the ring 43, is supported on ring 43 by a plurality of ring segments 45, each welded at its opposite ends to the rings 43 and 44. Rings 43 and 44 define between them a V-shaped valley 49 into which the bones fall as they move out of the lower end of the rotating drum 16. The bones become wedged between the rings 43 and 44 and are carried upwardly typically at least a quarter turn of the drum 16, as it rotates.

A chute 47 is supported on the lower end of frame extension 42, as described in detail in the copending application of Conrad and Pope, Serial No. 9,513, (Dkt. 8106) mentioned above.

Figure 2:
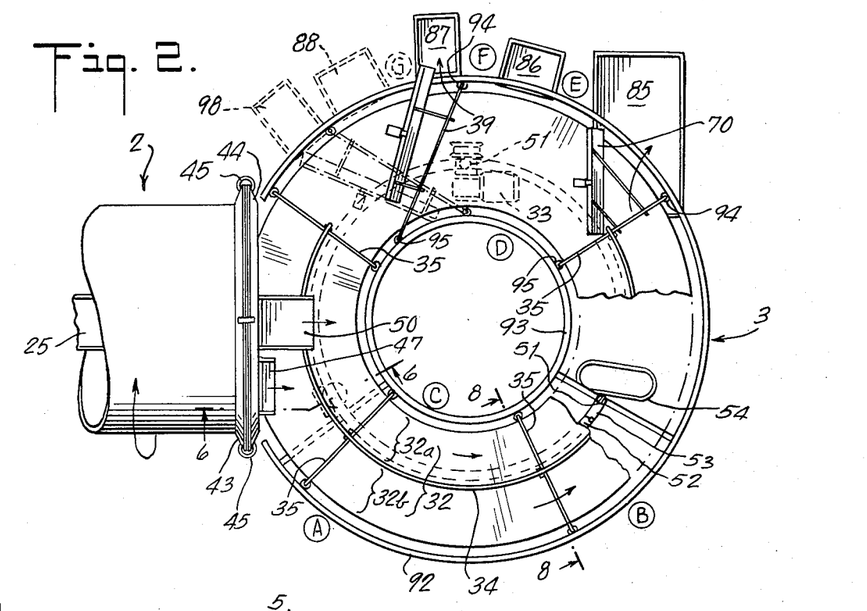
FIG. 2 is a fragmentary view, taken along the line 2—2 of FIG. 3, showing the discharge end of the separator drum and the inspection table in the apparatus of FIG. 1.
Figure 3:
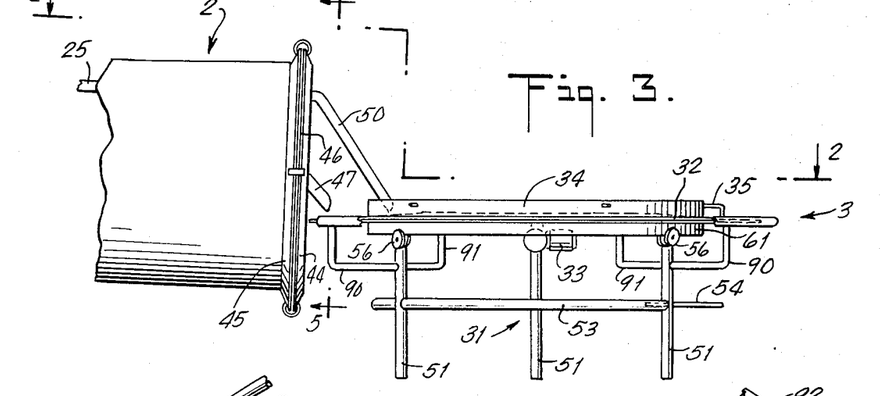
FIG. 3 is an elevational view of the apparatus of FIG. 2.

A finger 46 is mounted on the chute 47 and projects into the valley 49, to a point between the edges of the tapered rings 43 and 44. The finger 46 is effective to knock loose any bones which may be jammed in the valley 49. Any bones which remain in the valley up to the level of the finger 46 are knocked out by that finger and fall down through the chute 47 onto the outer section 32b of the rotating table 32, as shown in FIGS. 2 and 3.

Figure 4:
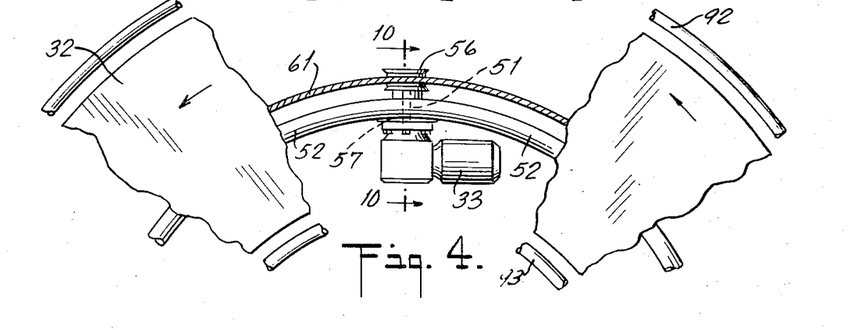
FIG. 4 is a fragmentary plan view, similar to a portion of FIG. 2, with part of the table broken away to illustrate the mounting of the table drive motor.
Figure 5:
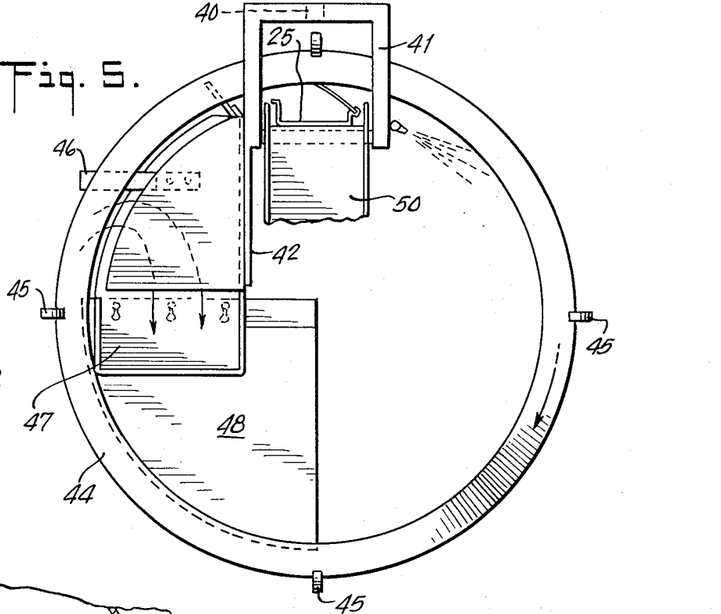
FIG. 5 is an end view of the separator drum taken along the line 5—5 of FIG. 3.

A shield 48, which may be a shield of nylon or other suitable flexible material is attached to the back of the chute 47 by means of keyhole slots which receive the heads of the rivets 47a fixed on the underside of the chute 47. The lower edge of shield 48 extends within and overlaps the inner edge of the tapered ring 44, as shown in FIGS. 4 and 5. The right-hand end of the reciprocating conveyor 25, as viewed in FIGS. 1, 2 and 3, discharges into a downwardly extending chute 50 which terminates above the inner section 32a of the rotating table 32.

The separation of meat and bones by the separator 2 is not perfect. Hence, the separator 16 deposits on the table 32 in the outer periphery 32b thereof, a stream of bones which may include an occasional piece of meat. At the same time, there is deposited from the chute 50 onto the inner section 32a of table 32 a stream of meat pieces, which may include an occasional bone. The purpose of the inspection table is to enable inspectors to remove the bones from the stream of meat pieces and to remove the meat from the stream of bones.

It may be seen that the surfaces of the rings 43 and 44 which engage the bones are readily cleanable, since complete access is available to the inside of the valley 49. Also, the chutes 47 and 50 are completely open for cleaning.

The table frame 31 (FIG. 3) comprises three legs 51 attached at their upper ends to a frame ring 52 (see FIG. 4). A segmental ring 53 (FIG. 3), about midway between the floor and the ring 52, extends part way around the periphery of the table, leaving a gap between the upper and right-hand legs 51, as viewed in FIG. 2. Attached to the right-hand leg 51 is a handrail 54, of generally oval configuration. The handrail 54 and the omission of frame 53 in that sector are for the convenience of personnel seeking entry to the space inside the table, so that they may readily duck under the table to reach their stations inside.

Figures 6, 8, 9, 10:
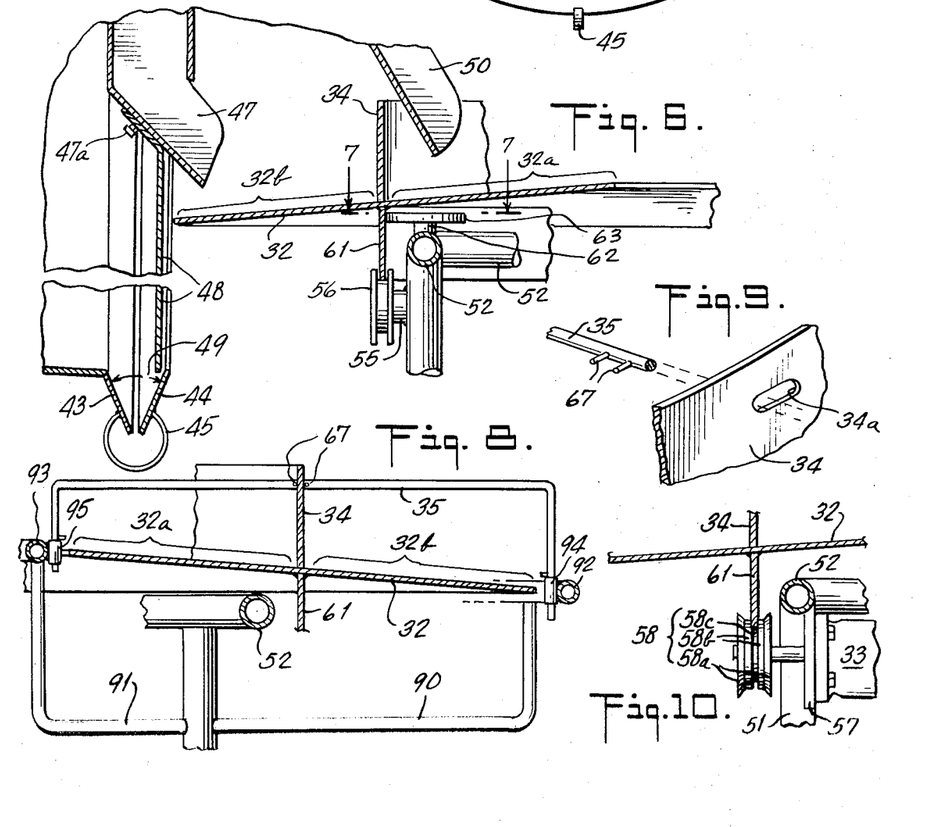
FIG. 6 is a sectional view on an enlarged scale taken along the line 6—6 of FIG. 2.
FIG. 8 is a fragmentary sectional view taken along the line 8—8 of FIG. 2.
FIG. 9 is an exploded perspective view illustrating the mounting of the divider wall.
FIG. 10 is a sectional view taken along the line 10—10 of FIG. 4.
Figure 7:
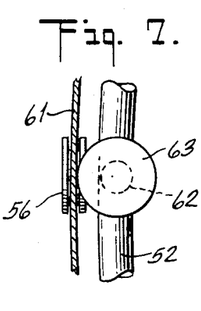
FIG. 7 is a fragmentary sectional view taken along the line 7—7 of FIG. 6.

Fixed on two of the legs 51 adjacent the upper ends thereof, but spaced somewhat below those upper ends, are arbors 55 on which are rotatably mounted flanged idler wheels 56 (see FIG. 6). The third leg 51 carries at a similar location a shaft 57 (FIG. 10) carrying a drive wheel 58 on its outer end and driven by motor 33 mounted on the inside of the leg.

The drive wheel 58 and the idler wheels 56 are all provided with peripheral grooves to receive the lower edge of a central rib 61 extending downwardly from the under side of the annular deck 32.

The drive wheel 58 consists of a clamped stack of discs including two outer flange discs 58a, of relatively wide diameter, a pair of slightly narrower discs 58b, of suitable wear resistant plastic material such as nylon or Tygon, and a central disc 58c, narrower than the discs 58b and also of nylon or Tygon. Tygon discs 58b and 58c are held in place by the flanged discs 58a. The disc 58c, which determines the spacing between the discs 58b, is thinner than the rib 61. Hence, the discs 58b are squeezed between flanges 58a and the rib 61 and grip its lower margin yieldably, driving it positively, and thereby rotating the table deck 32. The Tygon discs 58b and 58c are compressible, and yield to the metal edge of the rib 61. The diameter of the central disc 58c is substantially the same as the diameter of the idler wheels 56, so that the table deck is supported horizontally at three points spaced 120° apart about its axis of rotation.

The drive wheel 58 and the idler wheels 56 support the deck 32 and all the parts of the apparatus resting upon that deck. Since the deck may not be perfectly circular, it is desirable to minimize the axially acting thrust forces on the drive wheel 58 and the idler wheels 56. Note that the flanges on the idler wheels 56, as best seen in FIG. 6, are spaced apart by a distance substantially greater than the thickness of the rib 61. Consequently, the rib 61 is free to move horizontally between the flanges on the idler wheels 56 to accommodate any lack of circularity in the rib 61. This construction avoids axial thrusts on the wheels 56 and 58 due to possible opposing forces at opposite sides of the deck 32.

Arbors 62 (FIG. 6) are mounted on the circular frame 52 above the tops of the two legs 51 which carry the idler wheels 56. The arbors 62 carry idler wheels 63 rolling against the inside surface of the rib 61. The wheels 63 hold the rotating deck centered on the supporting frame 31. The idler wheels 63, which rotate on vertical axes, are protected against any vertical axial thrust. These wheels roll on the rib 61 at a locality where that rib has a substantial vertical extent. Since there are only two of the idler wheels 63, they can accommodate all lateral movements of the rib 61, such as those occasioned by a lack of circularity or by a mounting of the apparatus on the floor which is not level.

The drive wheel axle is supported on bearings adapted to support either radial loads (e.g., due to the weight of the deck 32) or axial loads. The bearings carrying the idler wheels 56 and 63 are designed primarily to support radial loads, and not axial thrusts.

The frame 31 includes a set of three outwardly projecting bracket arms 90 and a set of inwardly projecting bracket arms 91. The bracket arms 90 support at their upper ends a guard rail 92, which may be of stainless steel pipe and which extends most of the way around the outer periphery of the deck 32, except at that sector where the deck is aligned with the discharge end of the separator 2. The function of the guard rail is to prevent the clothing of the people working at the table from coming in contact with the edge of the deck 32 on which the food pieces are carried. Similarly, the inner bracket arms 91 support a guard rail 93 which extends completely around the inner periphery of the deck 32. The guard rail 93 is spaced radially inwardly from the deck 32 and the guard rail 92 is spaced radially outwardly, so that both the deck and the guard rail may be conveniently and completely cleaned.

Welded on the inside of the outer guard rail 92 at spaced intervals are a plurality of vertically extending pipe sockets 94. A similar plurality of pipe sockets 95 are welded on the outside of the guard rails 93. Each yoke 35 consists of an inverted U-shaped rod, whose lower ends fit into the pipe sockets 94 and 95. The legs of the yokes 35 carry stop pins 35a and 35b, which limit the downward movement of the yokes into the pipe sockets 94 and 95. Adjacent the middle of the horizontal bight of each yoke 35 there are provided a pair of pins 67 extending in the direction from which the rotating table approaches that yoke. The divider wall 34 is provided with slots 34a (best seen in FIG. 9) for receiving the yokes 35. The spacing between the pins 67 is such that the divider wall 34 fits snugly between the two pins. As the table rotates, the divider wall 34 is held against rotation by the yokes 35 passing through the slots 34a. The friction of the deck against the bottom of the divider wall holds the divider wall in place between the pins 36. When disassembling the divider wall 34 and the yokes 35, the yokes 35 are simply lifted out of the sockets 94 and 95, whereupon each yoke may be slid along its slot 34a to allow passage of the pins 67. The yoke 35 may be rotated when necessary to allow passage of one of the pins 35a and 35b. Thus, it may be seen that the divider wall 34 and its supporting assembly may be readily taken apart for cleaning without the use of tools, and that all the surfaces involved may be readily cleaned.

Figures 11, 12, 13:
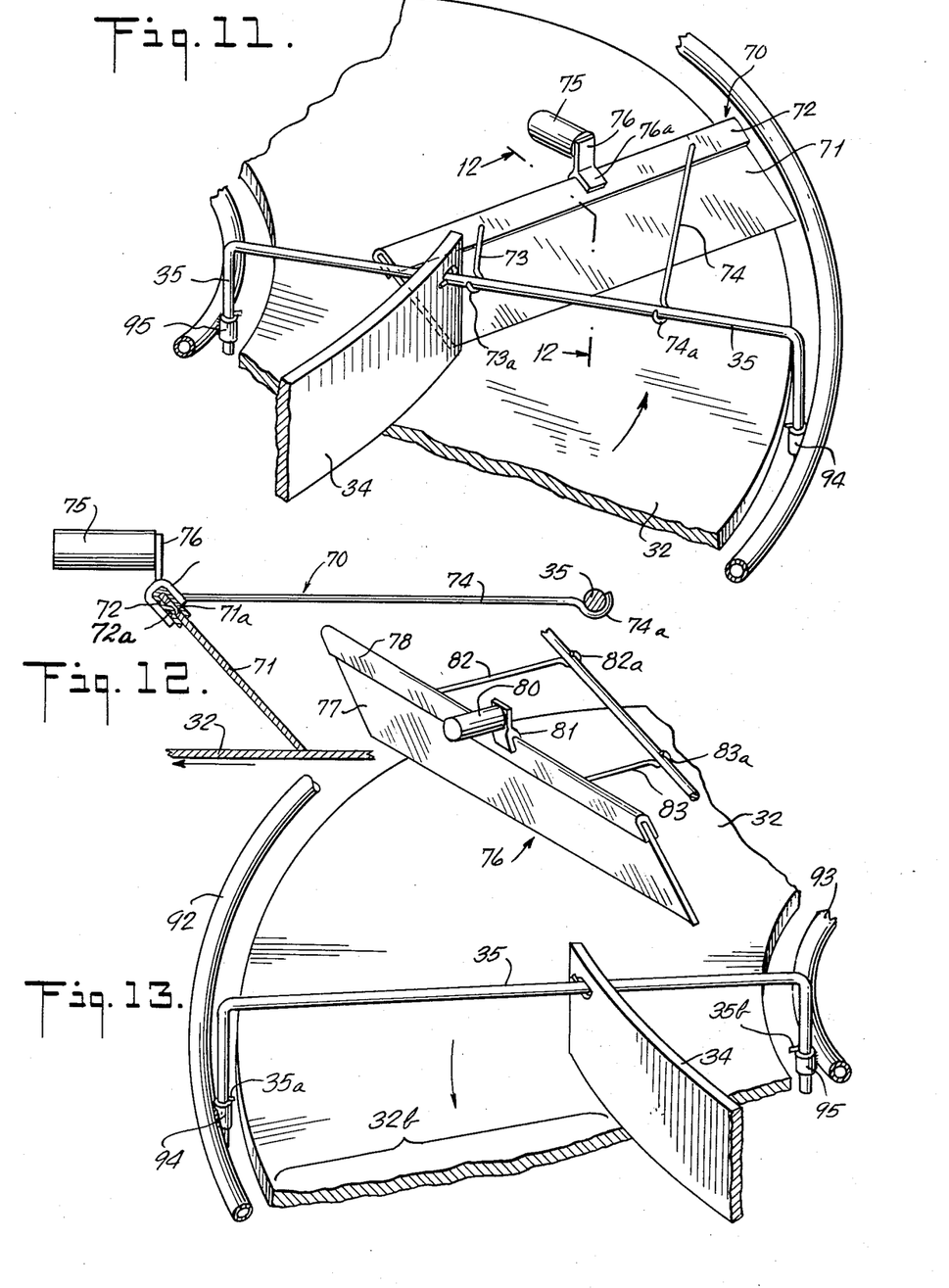
FIG. 11 is an enlarged perspective view showing the mounting of the scraper downstream from the end of the divider wall.
FIG. 12 is a sectional view taken along the line 12—12 of FIG. 11.
FIG. 13 is an enlarged perspective view showing the mounting of the scraper at the upstream end of the divider wall.

A scraper, generally indicated by the reference numeral 70, is mounted at the downstream end of the divider 34, as shown in FIGS. 11 and 12. The scraper 70 includes a blade 71 having its upper end received in a channel section 72, and held in place therein by the engagement of apertures 71a in the blade 71 with projections 72a in one side of the channel section 72. Each of a pair of arms 73, 74, has one end welded to the upstream side of the channel 72. Hooks 73a, 74a, are provided at the ends of the arms 73 and 74. The hooks 73a and 74a open upwardly so that they may engage the under side of the bight of yoke 35. A weight 75 is attached at one end to an arm 76 which is integral with a yoke 76a which receives and is welded to the outside of the channel section 72. The weight 75 is elongated and projects from the channel 72 in a direction opposite to that of the arms 73 and 74. The scraper assembly, including the blade 71, channel 72, arms 74 and weight 75 is balanced about the lower edge of the blade 71 as a fulcrum so that the weight 75 holds the hooks 73a, 74a engaged with the yoke 35. Thus, the entire assembly may be dismantled for cleaning, without the use of tools, by simply lifting the weight 75 and disengaging the hooks 73a, 74a from the under side of the yoke 35.

FIG. 13 illustrates the construction of a scraper 76 adjacent the upstream end of the divider 34. Scraper 76 comprises a blade 77 with a rigid channel 78 engaging its upper edge. A weight 80 is attached to a yoke member 81 which engages the outer surface of the channel 78. A pair of arms 82 and 83 extend from one side of the channel 78 and have hooks 82a and 83a at their ends, which engage the under surface of a yoke 39 having a somewhat longer bight than the yokes 35. The length of yoke 39 accommodates a mounting by which it is supported at an angle to a radius of the deck 32. Note that the sockets 94 and 95 that support the yoke 39 are not radially aligned, as are the sockets 94 and 95 that support each yoke 35. The yoke 39 and its scraper 76 may be mounted in the full line position shown in FIG. 2, or in the dotted line position, depending upon the method of operation to be used, as explained below.

Scraper blades 71 and 77 may be of nylon or other suitable wear-resistant material which will slide smoothly and with low friction on the deck 32. The scrapers may be readily removed from their associated channels for cleaning by simply snapping the scrapers out past the projections 72a.

METHOD OF OPERATION

While the method of operation described herein was devised particularly for the separation of a mixture of meat pieces and bones, it will be readily understood that it could be readily applied to the separation of any mixture of first and second classes of articles, where one of the two classes is a preferred class. In the present situation, the meat pieces constitute the preferred class of articles, and it is desired to ensure that the meat pieces leaving the separating operation have no bones mingled with them. While it is also desirable, from the standpoint of economy, to have no meat pieces mingled with the bones, the bones are nevertheless useful if they do have a few meat pieces mixed with them, so that complete separation of the meat from the stream of bones is not quite so important. The method is equally applicable to other mixtures of articles, where it is desired to secure an output stream of one class of articles completely free of articles of the other class, whereas the output stream of the second class of articles need not be completely free of articles of the first class.

The method is best illustrated in FIG. 2, where it may be seen that the separator 2 deposits on the inner classification area 32a of the table deck 32 a stream consisting mostly of meat particles, but which may contain an occasional bone. The separator 2 also deposits on the outer classification area 32b, a stream of bones which may contain occasional meat pieces. Operators stand at the stations identified as A, B, C, D, E and F in the drawing. If the dotted line position of scraper 76 is used, an operator may also stand at station G. The operators at A and B manually remove any meat pieces appearing in the bone stream on area 32b and transfer them to the meat stream on the classification area 32a. The operator at C similarly transfers bones appearing in the meat stream on the classification area 32a across the divider 34 to the bone stream on the area 32b. More than two operators may be spaced along the periphery of the table between the separator 2 and a bone bin 85. Similarly, more than one operator may be placed inside the table in that region between the separator 2 and the bone bin 85. The scraper 70 is effective to remove from the outer classification area 32b all the bones and whatever meat particles and pieces may remain therein, simply scraping them off the edge of the table into the bin 85, which may be a truck mounted bin so that it can be periodically replacEd. Alternatively, a conveyor may be used in place of the bin 85.

The operator of station D takes the meat pieces approaching along the inner annular classification area 32a and spreads them across the full width of the annular table 32. The operator standing at station E and F (and the one at G, if that is used) remove the meat pieces from the table and place them in receptacles 86 and 87. Again, conveyors may be used in place of receptacles 86 and 87. No particles of the preferred class, i.e., meat pieces, are removed from the table except for manual removal by the operators at stations E and F. Any meat pieces remaining on the table beyond stations E and F are recirculated by the action of the scraper 76, which restores all pieces approaching that scraper to the inner classification area 32a, so that such pieces join the stream of incoming meat pieces from the chute 50 and move around the table again.

It is thus insured that no meat piece is removed from the conveyor except by the action of one of the operators at stations E and F, thereby minimizing the possibility that a bone may be included in the meat pieces collected in the receptacles 86 and 87.

If the scraper 76 is placed in the dotted line position instead of the full line position, then an additional station G is provided for an operator to remove meat pieces and place them in a bin 88. Furthermore, all pieces of whatever nature passing the station G are scraped off the table by scraper 76 and deposited in a bin 98.

I claim:
1. Classifying apparatus, comprising:
   a. an annular table including:
      1. an annular deck;
      2. frame means located under the deck and supporting the deck;
      3. means on the frame means for rotating the deck about its axis;
   b. a divider wall concentric with the deck and extending upwardly from the top surface thereof at a locality between its inner and outer peripheries, said wall being effective to separate inner and outer classification areas between which articles are transferrable only by movement over the wall;
   c. stationary means engaging and supporting said divider wall and maintaining it stationary with its bottom edge in engagement with the rotating deck, said stationary means extending around at least one edge of the deck and being supported on the frame means under the deck;
   d. said stationary means comprising a member extending transversely above the deck and provided with two spaced pins extending horizontally toward the direction from which the rotating table approaches the member, said pins being spaced apart by a distance substantially equal to the thickness of the divider wall;
   e. said wall having a slot elongated horizontally to receive the member and pins; and f. said wall being frictionally biased by the rotation of the deck to hold one end of the slot between the two pins.

2. Classifying apparatus, comprising:
   a. an annular table including:
      1. an annular deck;
      2. frame means located under the deck and supporting the deck;
      3. means on the frame means for rotating the deck about its axis; and
   b. a divider wall concentric with the deck and extending upwardly from the top surface thereof at a locality between its inner and outer peripheries, said wall being effective to separate inner and outer classification areas of the top surface of the deck, between which areas articles are transferrable only by movement over the wall, said wall extending less than 360° around the axis of the deck; wherein the improvement comprises:
   c. a scraper at the end of the wall toward which the deck is moving, said scraper extending diagonally across the outer classification area and engaging the deck, being effective as the deck rotates to scrape articles on said outer classification area off the edge of the table;
   d. means supporting the scraper, comprising a member extending over the deck; and
   e. a scraper blade support channel receiving the upper end of the scraper blade; and
   f. two scraper supporting arms extending horizontally from said channel and terminating in hooks extending under and engaging said member.

3. Apparatus as defined in claim 2, including a weight attached to said scraper support channel and projecting horizontally therefrom in the opposite direction to said scraper supporting arms, said weight being effective to hold the hooks on the scraper supporting arms in engagement with the member.

4. Apparatus as defined in claim 2, in which said supporting arms extend from said member in the direction of motion of the deck.

5. Apparatus as defined in claim 2, including a second scraper located upstream from the upstream end of the divider wall and effective to scrape articles in the outer classification area into the inner classification area.

6. Apparatus as defined in claim 2, including common support means for the scraper and the adjacent end of the wall.

7. Apparatus for classifying meat pieces and bones from a mixture thereof comprising:
   a. an annular table including:
      1. an annular deck;
      2. frame means located entirely under the deck and supporting the deck;
      3. means on the frame means for rotating the deck about its axis; and
   b. a divider wall concentric with the deck and extending upwardly from the top surface thereof at a locality between its inner and outer peripheries, said wall being effective to separate inner and outer classification areas of the top surface of the deck, between which areas articles are transferrable only by movement over the wall; wherein the improvement comprises:
   c. means for supplying a first stream consisting mostly of meat pieces to the inner classification area;
   d. means for supplying a second stream consisting mostly of bones to the outer classification area;
   e. said wall extending about 270° around the periphery of the rotating deck;
   f. a first scraper on the outside of the wall at the downstream end thereof for scraping the stream of bones off the outer edge of the rotating deck; and
   g. a second scraper at the upstream end of said wall for scraping of articles from one of said classification areas.

8. Apparatus as defined in claim 7, wherein said divider wall and said rotating deck cooperate to define:
   a. at least one work station outside said wall where an inspector may remove meat pieces from said second stream and pass them across the wall to the inner classification area;
   b. at least one station inside the wall where an inspector may remove the bones from the first stream and pass them over the wall to the outer classification area;
   c. a station just beyond the downstream end of the wall where the meat pieces remaining in the inner classification area may be spread over the entire surface of the deck; and
   d. at least one station between the downstream end of the wall and the upstream end thereof, at the outside of the deck, where pieces of meat may be manually removed from the deck.

9. Classifying apparatus comprising:
   a. an annular table including:
      1. an annular deck having a central rib extending downwardly from its under side;
      2. a frame for supporting the deck, including a circular member at the top thereof and three vertical legs spaced 120° apart around the periphery of said circular member, said circular member having a diameter slightly smaller than that of said central rib;
   b. three support wheels mounted on said legs near the upper end thereof and below said circular member, each said support wheel being rotatable about a horizontal axis and having a grooved periphery adapted to engage rollingly the under surface of said central rib;
   c. means for driving at least one of said support wheels so as to rotate the deck about its vertical axis;
   d. said one support wheel comprising a pair of discs of compressible material spaced apart by a groove narrower than the thickness of said central rib, so that said one wheel frictionally grips said central rib and positively rotates the annular deck about its axis; and
   e. the other two of said support wheels comprising idler wheels supported to carry substantially only radial forces, each said idler wheel having a peripheral groove wider than the thickness of said central rib so as to allow substantial movement of the central rib within said groove with respect to the wheel without transferring any substantial axial force to the wheel.

10. Classifying apparatus as defined in claim 9, including:

a. two idler wheels journaled for rotation about vertical axes and mounted on the two of said three legs which carry the horizontal axis idler wheels, said two vertical axis idler wheels being mounted so as to engage the inner surface of said central rib.

* * * * *